United States Patent
Bar-zeev et al.

(10) Patent No.: US 12,361,646 B1
(45) Date of Patent: Jul. 15, 2025

(54) PRIVATELY SHARING USER PREFERENCES

(71) Applicant: Apple Inc., Cupertino, CA (US)

(72) Inventors: Avi Bar-zeev, Oakland, CA (US);
Ranjit Desai, Cupertino, CA (US);
Rahul Nair, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 163 days.

(21) Appl. No.: 18/144,976

(22) Filed: May 9, 2023

Related U.S. Application Data

(60) Provisional application No. 63/341,121, filed on May 12, 2022.

(51) Int. Cl.
| | | |
|---|---|---|
| *G06T 19/00* | (2011.01) | |
| *G06F 3/01* | (2006.01) | |
| *H04W 8/20* | (2009.01) | |
| *H04W 12/02* | (2009.01) | |
| *H04W 84/18* | (2009.01) | |

(52) U.S. Cl.
CPC ............. *G06T 19/00* (2013.01); *G06F 3/011* (2013.01); *H04W 8/20* (2013.01); *H04W 12/02* (2013.01); *G06T 2219/024* (2013.01); *H04W 84/18* (2013.01)

(58) Field of Classification Search
CPC ... G06T 19/00; G06T 2219/024; G06F 3/011; H04W 8/20; H04W 12/02; H04W 84/18
See application file for complete search history.

(56) References Cited

U.S. PATENT DOCUMENTS

| 7,805,131 B2 | 9/2010 | Cholkar et al. |
| 8,286,086 B2 | 10/2012 | Sampson et al. |

(Continued)

FOREIGN PATENT DOCUMENTS

| JP | 2006155109 A | 6/2006 |
| JP | 2007018386 A | 1/2007 |

(Continued)

OTHER PUBLICATIONS

Germain, Thomas; "Facebook Updates Facial Recognition Settings after CR Investigation"; Sep. 3, 2019; pp. 1-8.

(Continued)

*Primary Examiner* — Terrell M Robinson
(74) *Attorney, Agent, or Firm* — Thompson Hine LLP

(57) ABSTRACT

Various implementations provide a method for determining how a second user prefers to be depicted/augmented in a first user's view of a multi-user environment in a privacy preserving way. For example, a method may include determining that a physical environment includes a second device, where a second user associated with the second device is to be depicted in a view of a three-dimensional (3D) environment. The method may further include determining position data indicative of a location of the second device relative to the first device. The method may further include sending the position data indicative of the location of the second device relative to the first device, to an information system (e.g., a user preference system). The method may further include receiving a user preference setting associated with the second user for depicting or augmenting the second user in the 3D environment from the information system.

21 Claims, 8 Drawing Sheets

(56) References Cited

U.S. PATENT DOCUMENTS

| | | |
|---|---|---|
| 9,497,202 B1 | 11/2016 | Calo et al. |
| 10,845,964 B2 | 11/2020 | Zhang |
| 10,917,259 B1 | 2/2021 | Chein et al. |
| 11,087,559 B1 | 8/2021 | Kuhn et al. |
| 11,627,118 B1 | 4/2023 | Terrano |
| 11,790,118 B2 | 10/2023 | Damick |
| 2009/0318224 A1* | 12/2009 | Ealey .................. A63F 13/533 463/31 |
| 2011/0202968 A1 | 8/2011 | Nurmi |
| 2012/0079019 A1* | 3/2012 | Miettinen ............. G06Q 50/00 709/204 |
| 2012/0079046 A1* | 3/2012 | Murphy ............. G06Q 30/0241 709/206 |
| 2013/0222266 A1* | 8/2013 | Gardenfors ........... G06F 3/1446 345/173 |
| 2013/0286223 A1 | 10/2013 | Latta |
| 2016/0019415 A1 | 1/2016 | Ra |
| 2017/0126630 A1 | 5/2017 | Ekambaram |
| 2018/0041489 A1* | 2/2018 | Narayanan .............. H04W 4/80 |
| 2021/0157542 A1 | 5/2021 | De Assis et al. |
| 2021/0368136 A1* | 11/2021 | Chalmers .............. G06F 3/0346 |
| 2022/0374543 A1 | 11/2022 | Chen |

FOREIGN PATENT DOCUMENTS

| | | |
|---|---|---|
| JP | 2024069926 A | 5/2024 |
| KR | 102518190 B1 | 4/2023 |

OTHER PUBLICATIONS

Haselton, Todd; "How To Block Facebook and Google from Identifying your face"; Jan. 22, 2020; pp. 1-12.

\* cited by examiner

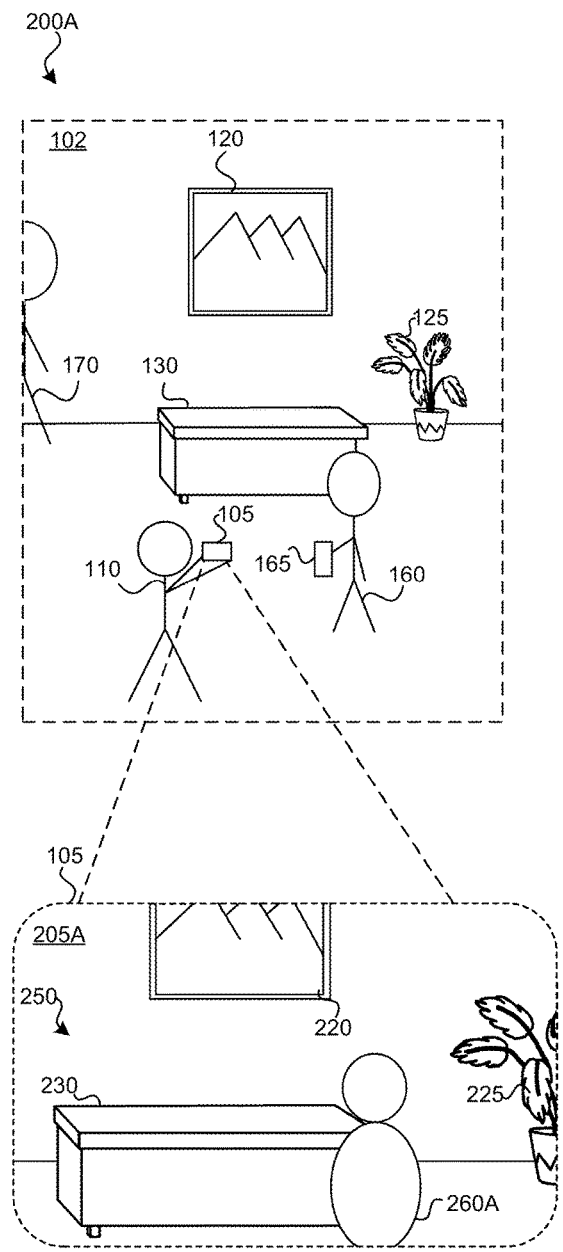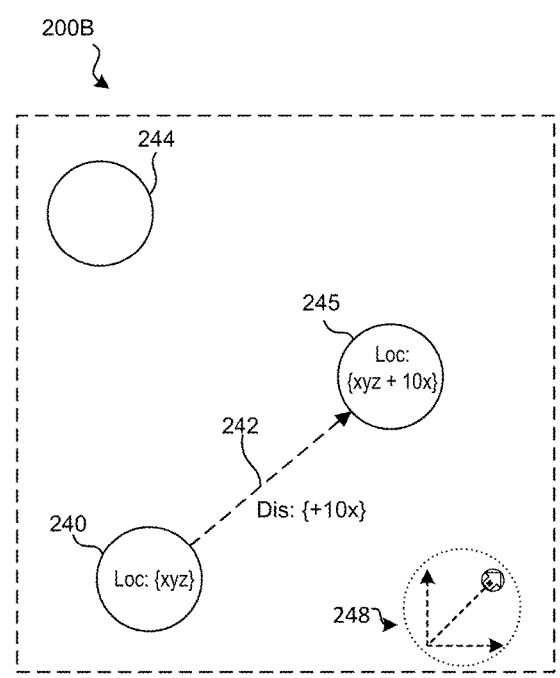
FIG. 2A
FIG. 2B

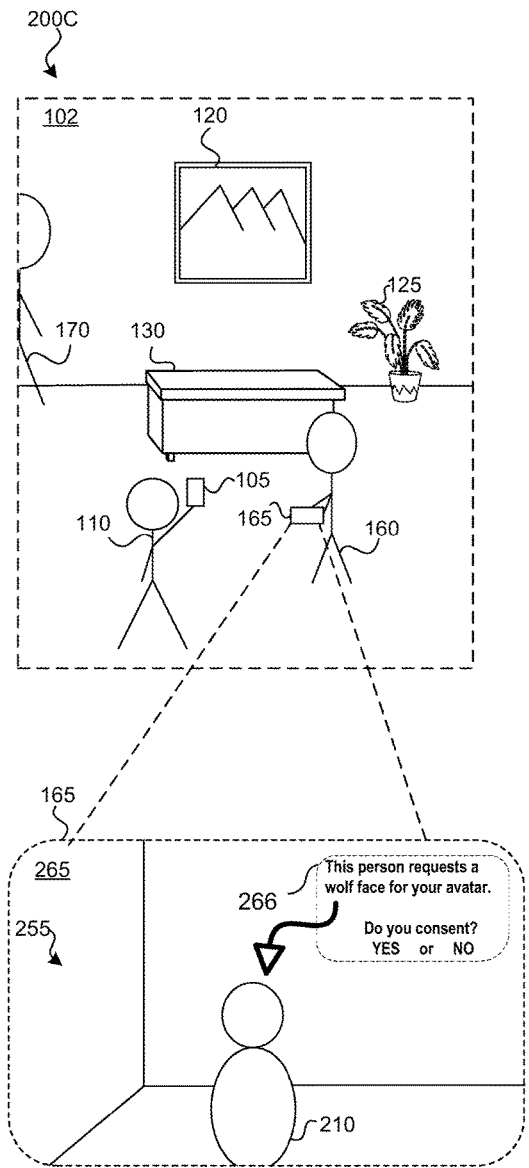
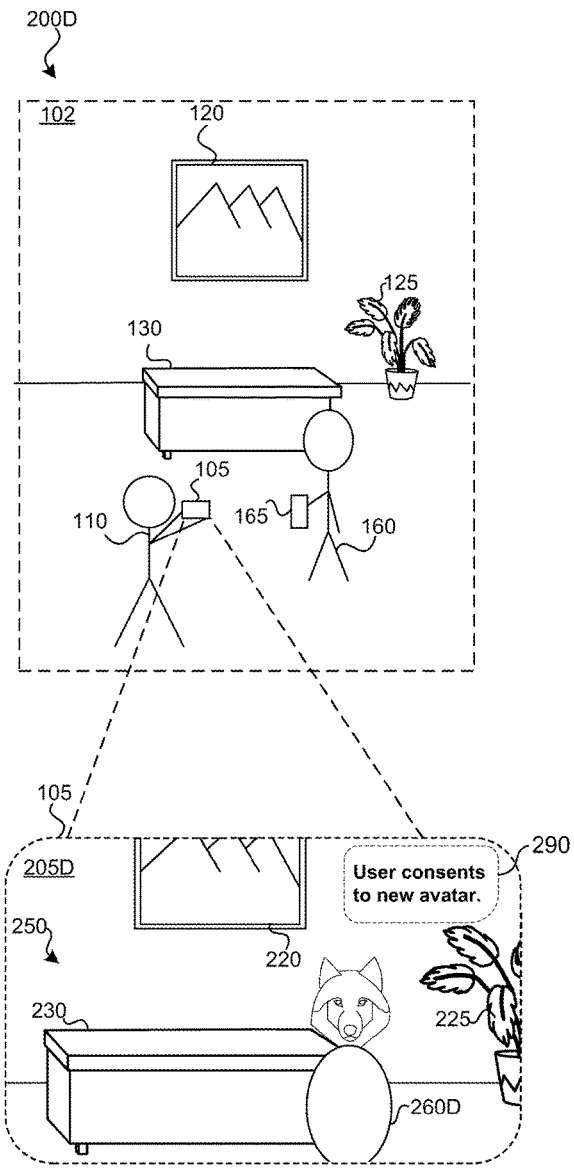
FIG. 2C       FIG. 2D

600

610 Determine that a physical environment includes a second device, where a second user is associated with the second device is to be depicted in a view of a 3D environment by the first device

620 Determine position data indicative of a location of the second device relative to the first device

630 Send the position data indicative of the location of the second device relative to the first device to an information system

640 Receive a user preference setting associated with the second user for depicting or augmenting the second user in the 3D environment from the information system

FIG. 6

PRIVATELY SHARING USER PREFERENCES

CROSS-REFERENCE TO RELATED APPLICATIONS

This application claims the benefit of U.S. Provisional Application Ser. No. 63/341,121 filed May 12, 2022, which is incorporated herein in its entirety.

TECHNICAL FIELD

The present disclosure generally relates to electronic devices that provide views of multi-user environments, including views that include representations of users that are shared based on privately shared user preferences.

BACKGROUND

Electronic devices apply user representation techniques (e.g., generating avatars) to provide various benefits to their users. For example, electronic devices may generate a user representation for another person that he or she may not have given permission for, such as, against his or her desire to display his or her avatar in a particular way. Thus, existing user representation techniques may be insufficient in various respects with respect to privacy when in use in multi-user, three-dimensional (3D) environments, such as extended reality (XR) environments provided during communication sessions.

SUMMARY

Various implementations disclosed herein include devices, systems, and methods that provide a depiction or augmentation of a second user within a multi-user 3D environment such as an extended reality (XR) environment provided during a communication session based on a user preference setting. Views that include representations (e.g., avatars) of multiple users in the XR environment may be provided to the first user participating in such a communication session. In some implementations, the processes described herein may determine how a second user prefers to be depicted/augmented in a first user's view of a multi-user environment in a privacy preserving way. A second user's preferences may be obtained without the devices needing to sacrifice user privacy, e.g., without having to (1) upload exact device positions or (2) perform facial recognition using a facial image database on a provider's server. Instead, the first user's device estimates a relative location of the second user's device and sends this estimated relative location to a server, which uses this information to determine the second user's preferences or to obtain consent from the second user. The second user's preferences may be automatically enforced in certain circumstances, for example, in an XR chat room in which all users have agreed to view other users based on their preferences/consent.

Certain implementations herein pertain to preserving a first user's privacy in generating his or her user representation in a multi-user 3D environment, such as within a chat room within an XR environment (e.g., in a physical environment via pass through video, in a virtual room, or in a combination of both). The first user may be enabled to set a privacy option to control who or what device is able to generate a user representation (e.g., automatic use preference settings). Additionally, or alternatively, the first user may be able to provide consent in response to notifications to ensure that a user representation for the first user is only provided if the first user consents.

In general, one innovative aspect of the subject matter described in this specification can be embodied in methods, at a first device operated by a first user having a processor, that include the actions of determining that a physical environment includes a second device, wherein a second user associated with the second device is to be depicted in a view of a three-dimensional (3D) environment by the first device, determining position data indicative of a location of the second device relative to the first device, sending, to an information system, the position data indicative of the location of the second device relative to the first device, and receiving, from the information system, a user preference setting associated with the second user for depicting or augmenting the second user in the 3D environment.

These and other embodiments can each optionally include one or more of the following features.

In some aspects, determining that the physical environment includes the second device includes determining that the second user is located in the physical environment and is depicted in the 3D environment.

In some aspects, the first device includes a short-range sensor and determining position data indicative of the location of the second device relative to the first device is based on sensor data acquired from the short-range sensor. In some aspects, the short-range sensor is an ultra-wideband (UWB) sensor.

In some aspects, the method further includes receiving, from the information system, a determination whether the second user provides user consent to the receiving the user preference setting associated with the second user at the first device. In some aspects, the user consent is a particular type of the user preference setting.

In some aspects, the information system determines that the second user provides user consent to the receiving the user preference setting associated with the second user at the first device based on receiving, at the first device via the information system, an affirmative response from the second user to a consent request. In some aspects, the information system determines that the second user provides user consent to the receiving the user preference setting associated with the second user at the first device based on determining that a privacy setting associated with the second user allows providing the user preference setting of the second user to the first user.

In some aspects, the information system determines that the second user provides user consent to the receiving the user preference setting associated with the second user at the first device based on determining that the first user operating the first device was previously identified by the second user to have consent to the user preference setting. In some aspects, the information system is configured to identify the first device based on the position data, identify an account associated with the first device, and identify the user preferences associated with the account. In some aspects, the information system acquires the user preference setting associated with the second user from the second device.

In some aspects, the user preference setting associated with the second user from the second device is acquired anonymously based on tokenization protocols. In some aspects, the method further includes determining whether to use the user preference setting associated with the second user based on a determined context of the 3D environment.

In some aspects, the method further includes presenting the view of the 3D environment that includes a depiction or augmentation of a representation of the second user based on the user preference setting associated with the second user.

In some aspects, presenting the view of the 3D environment that includes the depiction or the augmentation of the representation of the second user is based on user consent provided by the second user based on the user preference setting associated with the second user.

In some aspects, the method further includes providing a notification to the second device based on receiving the user preference setting associated with the second user at the first device.

In some aspects, the physical environment includes a third user associated with a third device that is to be depicted in the in the view of the 3D environment by the first device.

In some aspects, determining position data indicative of the location of the second device relative to the first device is based on identifying a mesh network associated with location information for the first device, the second device, and the third device.

In some aspects, the information system is located at the first device. In some aspects, the information system is a server external to the first device.

In some aspects, the 3D environment includes an extended reality (XR) environment. In some aspects, the 3D environment includes an extended reality (XR) environment.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 2A illustrates exemplary electronic devices operating in the same physical environment during a communication session with a view for a first device of a first user that includes a user representation of a second user within an extended reality (XR) environment in accordance with some implementations.

FIG. 2B illustrates an example location map based on the locations of the electronic devices operating in FIG. 2A.

FIG. 2C illustrates exemplary electronic devices operating in the same physical environment during a communication session with a view for a second device of a second user that includes a consent approval for a user representation of the second user for a view for the first user of FIG. 2A in accordance with some implementations.

FIG. 2D illustrates exemplary electronic devices operating in the same physical environment during a communication session with a view for the first device of the first user that includes a user representation of the second user that the second user consented to in FIG. 2C in accordance with some implementations.

FIG. 6 is a flowchart illustrating a method for determining how a second user prefers to be depicted/augmented in a first user's view of a multi-user environment in a privacy preserving way in accordance with some implementations.

Figure 1:
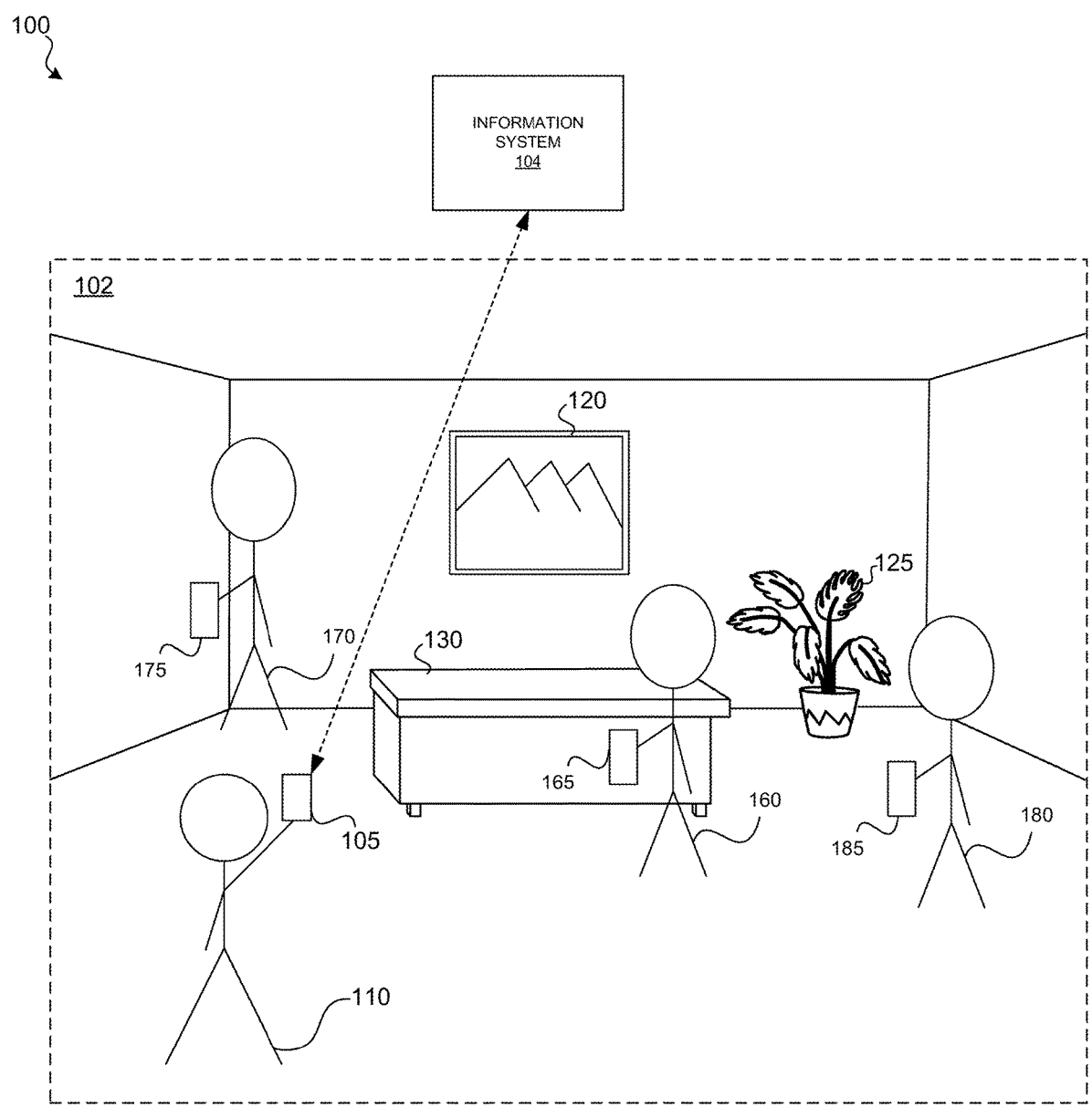
FIG. 1 is an example of multiple devices used within a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an example environment 100 of exemplary electronic devices 105, 165, 175, and 185 operating in a physical environment 102. Additionally, example environment 100 includes an information system 104 in communication with one or more of the electronic devices 105, 165, 175, and 185. In an exemplary implementation, electronic devices 105, 165, 175, and 185 are communicating during a communication session, e.g., while the electronic devices 105, 165, 175, and 185 are sharing information with one another or an intermediary device such as a communication session server within the information system 104. Additionally, physical environment 102 includes user 110 holding device 105, user 160 holding device 165, user 170 holding device 175, and user 180 holding device 185. In some implementations, the devices are configured to present views of an extended reality (XR) environment, which may be based on the physical environment 102, and/or include added content such as virtual elements providing text narrations. In another example, a communication session may involve users located in different physical environments who are enabled via the communication session to view representations of one another and/or interact within a common environment, such as an XR environment generated based one of the user's physical environments. In another example, multiple users present in the same or different physical environments view representations of one another and/or interact within a common virtual environment.

In the example of FIG. 1, the physical environment 102 is a room that includes physical objects such as wall hanging 120, plant 125, and desk 130. Each electronic device 105, 165, 175, and 185 may include one or more cameras, microphones, depth sensors, motion sensors, or other sensors that can be used to capture information about and evaluate the physical environment 102 and the objects within it, as well as information about each user 110, 160, 170, and 180 of the electronic devices 105, 165, 175, and 185, respectively. The information about the physical environment 102 and/or each user 110, 160, 170, and 180 may be used to provide visual and audio content during the communication session. For example, a communication session may provide views of a 3D environment that is generated based on camera images and/or depth camera images (from an electronic device) of the physical environment 102 as well as a representation of one or more of the users 110, 160, 170, and 180 based on camera images and/or depth camera images captured of each user, or based on user preference settings that control a view of the user representation if consented by the user. One or more the electronic devices may provide views of a 3D environment that includes representations of the users 110, 160, 170, and 180. Such views are illustrated in the examples of FIGS. 2A-2D and FIG. 4 described next.

FIG. 2A illustrates exemplary electronic devices operating in the same physical environment during a communication session with a view for a first device of a first user that includes a user representation of a second user within an extended reality (XR) environment in accordance with some implementations. In particular, FIG. 2A illustrates an exemplary environment 200A of an exemplary view 205A of a physical environment 102 provided by an electronic device 105 during a communication session with user 160 using device 165. The view 205A is of a 3D environment 250 that is based on the physical environment 102 and added elements, such as a user representation 260A of user 160. FIG. 2 illustrates determining whether there is consent to obtain a user preferred user representation (e.g., view a different avatar with consent from user 160). For example, a consent notification (for a communication session may be provided so that the second user (e.g., user 110) can be prompted that another user (e.g., user 160) is wanting to initiate a communication session (e.g., to view a new avatar). In this example, during the communication session, the electronic device 105 provides a view 205A that enables user 110 to view a representation 260A of at least a portion of user 160 within the 3D environment 250 (e.g., an XR environment) from the communication session (e.g., the user 110 sees a standard or user approved generated avatar of the other user 160, may see live video of the other user 160 via pass through video, or may see a direct view of the other user 160 through a transparent or translucent display). For example, the user 110 views the representation of the other user 160 and a representation of the physical environment 102 of user 110 (e.g., an office of user 110). The view 205A includes representation 225 of plant 125, representation 220 of wall hanging 120, and representation 230 of desk 130.

In one implementation, the user 110 may verbally request from user 160 if they consent with a different user representation. If the verbal request is approved, the system may use that verbal consent to proceed and allow user 110 to view the different user representation from that particular user. For example, the user 110 may ask user 160 for consent, e.g., "May I use a wolf avatar?" The user 160 may then simply reply with "Yes" to approve consent. Alternatively, the consent required may need to be more specific depending on the privacy settings. For example, the user 160 may need to specifically state the consent being requested including a particular timeframe for the different user representation, e.g., "Yes, I give my consent for you to use a different avatar for our present conversation." The device 105 and/or device 165 may record and analyze that particular audio that provides consent to recognize that a verbal consent question was posed by user 110, and that user 160 provided verbal consent. Alternatively, a notification bubble may also be provided to user 160 at device 165 that includes a selection on whether or not user 160 allows consent for user 110 to view a different user representation during the current conversation between user 110 and user 160. For example, the notification bubble for allowing consent may include information such as the user requesting consent, and selectable options on a duration that the consent may or may not include. For example, a consent approver (e.g., user 160), may select to only allow a view of the user representation but not allow recording of the communication with the new user presentation. Additionally, a consent approver (e.g., user 160), may select to only allow the new user representation to be used for only a particular duration (e.g., the particular conversation with user 110, a time period such as the ten minutes, a period for an event such as the social gathering). Additionally, a consent approver (e.g., user 160), may select to allow transcription and/or recording of the audio for the particular user (e.g., user 110) indefinitely via the privacy settings (e.g., user preference settings). In other words, user 160 may trust user 110 and always allow them to view a different user representation for private communication sessions.

In some implementations, the verbal approval may be limited to a particular event (e.g., a social gathering) for a particular time period (e.g., for that day of the event), and/or for a particular location. For example, if the two users leave that room or engage in other conversations with other people, then the consent may or may not be approved and thus may need to be acquired again before a new user representation can be obtained.

FIG. 2B illustrates an example location map based on the locations of the electronic devices operating in FIG. 2A. In particular, FIG. 2B illustrates location map 200B that includes a location of devices within the view of physical environment 102 of the exemplary environment 200A. The location map 200B illustrates a two-dimensional (2D) top-down view of locations of representations of devices or other representations of objects within a 3D environment. In this example, during an example of recording content for a communication session (e.g., the recorded content of FIG. 2A within the 3D environment 250), a recording or viewing session instruction set executed on an electronic device (e.g., device 105), or networked through an external server, can generate a location map 200B based on the detected devices (e.g., device 105, 165, 175, etc.). For example, location indicator 240 depicts a location for device 105, location indicator 244 depicts a location for device 175, and location indicator 245 depicts a location for device 165 for the physical environment 102 illustrated in FIG. 2A. For example, as illustrated in the location map 200B, the location of device 105 as indicated by location indicator 240 is {xyz} and the location of device 165 as indicated by location indicator 245 is {xyz+10x}, based on the distance between each device (e.g., distance 242 of {+10x}). Thus, the second device's location 245 is determined to be approximately ten feet to the north (with respect to true north based on the compass 248) of the first device's location 240 at a particular time (e.g., based on the short-range sensor data, GPS coordinates, WiFi location, SLAM localization techniques, a combination thereof, or the like).

FIG. 2C illustrates exemplary electronic devices operating in the same physical environment during a communication session with a view for a second device of a second user that includes a consent approval for a user representation of the second user for a view for the first user of FIG. 2A in accordance with some implementations. In particular, FIG. 2C illustrates an exemplary operating environment 200C of an exemplary view 265 of an electronic device 165 during a communication session with user 110 using device 105, where the view 265 is of a 3D environment 255 that is a representation of the physical environment 102 of the device 165. In particular, operating environment 200C illustrates a text transcription of a consent request (e.g., transcription bubble 266) for permission to view a different user representation (e.g., a wolf avatar) during communication session. In this example, during the communication session, the electronic device 165 provides a view 265 that enables user 160 to view a representation 210 of at least a portion of user 110 within the 3D environment 255 (e.g., an XR environment) from the communication session (e.g., the user 160 sees a consent approved or standard generated avatar of the other user 110, may see live video of the other user 110 via pass through video, or may see a direct view of the other user 110 through a transparent or translucent display). For example, the user 160 views the representation of the other user 110 and a representation of the physical environment 102 of user 110 from a different perspective than user 110 viewed user 160 in FIG. 2A (e.g., the back of the room of physical environment 102).

Additionally, the view 265 includes an interactable notification bubble 266 that provides a consent request from user 160 to view a different user representation (e.g., a wolf avatar). As discussed herein, consent may be provided based on privacy settings from the user 160. For example, device 105 may be able to detect from device 165, during a communication session, that the user 160 has a privacy setting that allows user 110 to automatically use a particular user representation. Additionally, or alternatively, consent may be provided by some form of approval/engagement with the viewer as discussed herein. For example, the user 110 may verbally request from user 160 if they consent. If the verbal request is approved, the system may use that verbal consent to proceed and allow user 110 to view the new user representation.

FIG. 2D illustrates exemplary electronic devices operating in the same physical environment during a communication session with a view for the first device of the first user that includes a user representation of the second user that the second user consented to in FIG. 2C in accordance with some implementations. In particular, FIG. 2D illustrates an exemplary environment 200D of an exemplary view 205D of a physical environment 102 provided by an electronic device 105 during a communication session with user 160 using device 165. The view 205D is of a 3D environment 250 that is based on the physical environment 102 and added elements, such as a user representation 260D of user 160 (e.g., a wolf avatar as consented by user 160). FIG. 2C illustrates that there is consent to use a user preferred user representation (e.g., view a different avatar with consent from user 160). The view 205D includes a notification bubble 290 that provides an indication that consent is approved to provide the user representation by user 160. For example, notification bubble 290 provides user 110 (via device 105) with the indication text: "User consents to new avatar" during a live communication session. As discussed herein, consent may be provided based on privacy settings from the speaker, by some type of approval/engagement with the other user, or obtained from user preference settings from a user information system.

Figure 3:
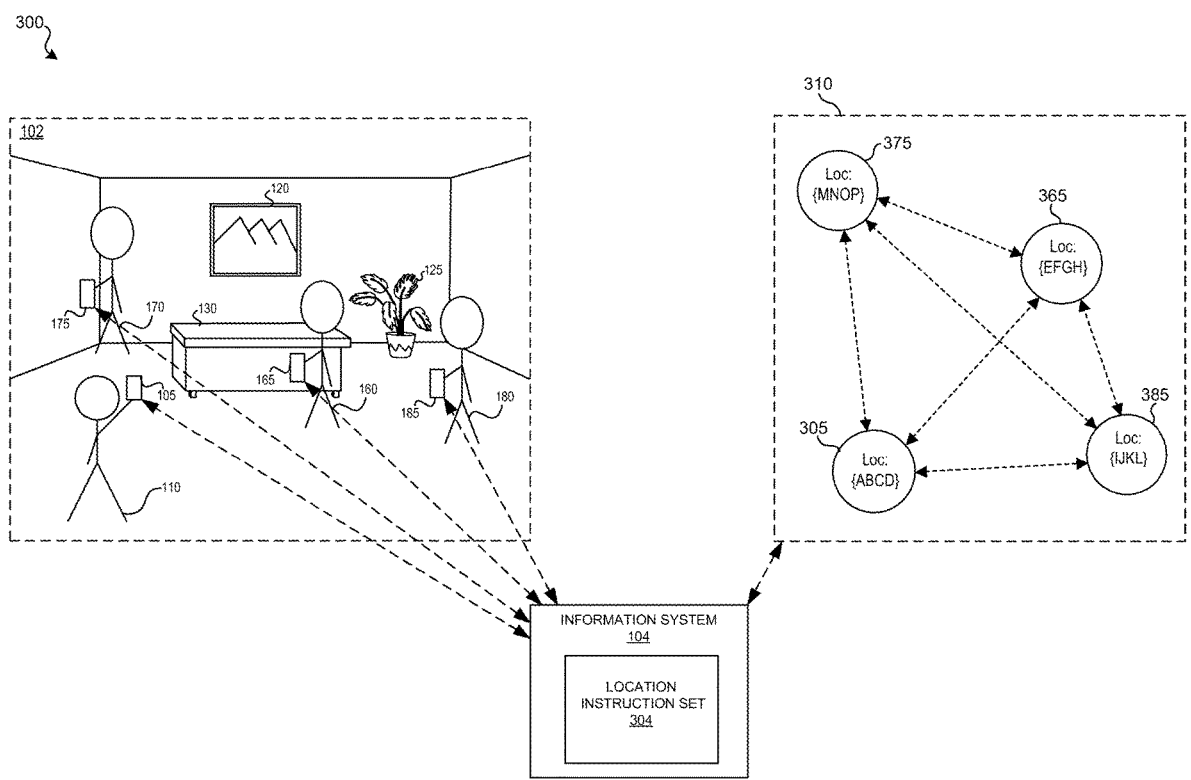
FIG. 3 illustrates exemplary electronic devices operating in the same physical environment during a communication session and an associated location map of a mesh network based on the locations of the electronic devices in accordance with some implementations.

FIG. 3 illustrates exemplary electronic devices operating in the same physical environment during a communication session and an associated location map of a mesh network based on the locations of the electronic devices in accordance with some implementations. In particular, FIG. 3 illustrates an exemplary environment 300 of the physical environment 102 of FIG. 1 and a generated mesh network map 310 from a location instruction set 304 based on the determined locations of the devices in physical environment 102. For example, a mesh network may be utilized based on the location/position data of multiple devices in a room (e.g., devices 105, 165, 175, 185, 510, etc.), while the identity of each device is kept anonymous (e.g., via anonymization, tokenization, etc.). In an exemplary implementation, the physical environment includes a third user (or more) associated with a third device that is to be depicted in the in the view of the 3D environment by the first device (e.g., device 175 for user 170, device 185 for user 180 within physical environment 102). In some implementations, determining position data indicative of the location of the second device relative to the first device is based on identifying a mesh network associated with location information for the first device, the second device, and the third device. For example, as illustrated in FIG. 3, a mesh network may be used to continuously update the locations of each device. In particular, location indicator 305 depicts a location for device 105 at Loc: {ABCD}, location indicator 365 depicts a location for device 165 at Loc: {EFGH}, location indicator 385 depicts a location for device 185 at Loc: {IJKL}, and location indicator 375 depicts a location for device 175 at Loc: {MNOP}, for the physical environment 102.

For example, Device A (e.g., device 105) may send a message to the server (e.g., information system 104) saying "I see a device with anonymous token 1234 at location X," (e.g., device 105 identifies device 165 at location {EFGH}). Device B (e.g., device 165) might later say "I see a device with anonymous token 5678 at location X'." For example, because there is a rotating token system, anonymous token 5678 refers to the same device as token 1234 (e.g., device 185 identifies device 165 at location {EFGH}). Therefore, when Device C (e.g., device 175) sees a device (e.g., device 165) at location X", it can send the location X" to the server where the server will retrieve and return user settings associated with the device (e.g., device 165) that was previously determined to be around location X/X' at location {EFGH} (which should correspond to location X"), as anonymously determined by tokens sent by Device A and Device B.

Figure 4:
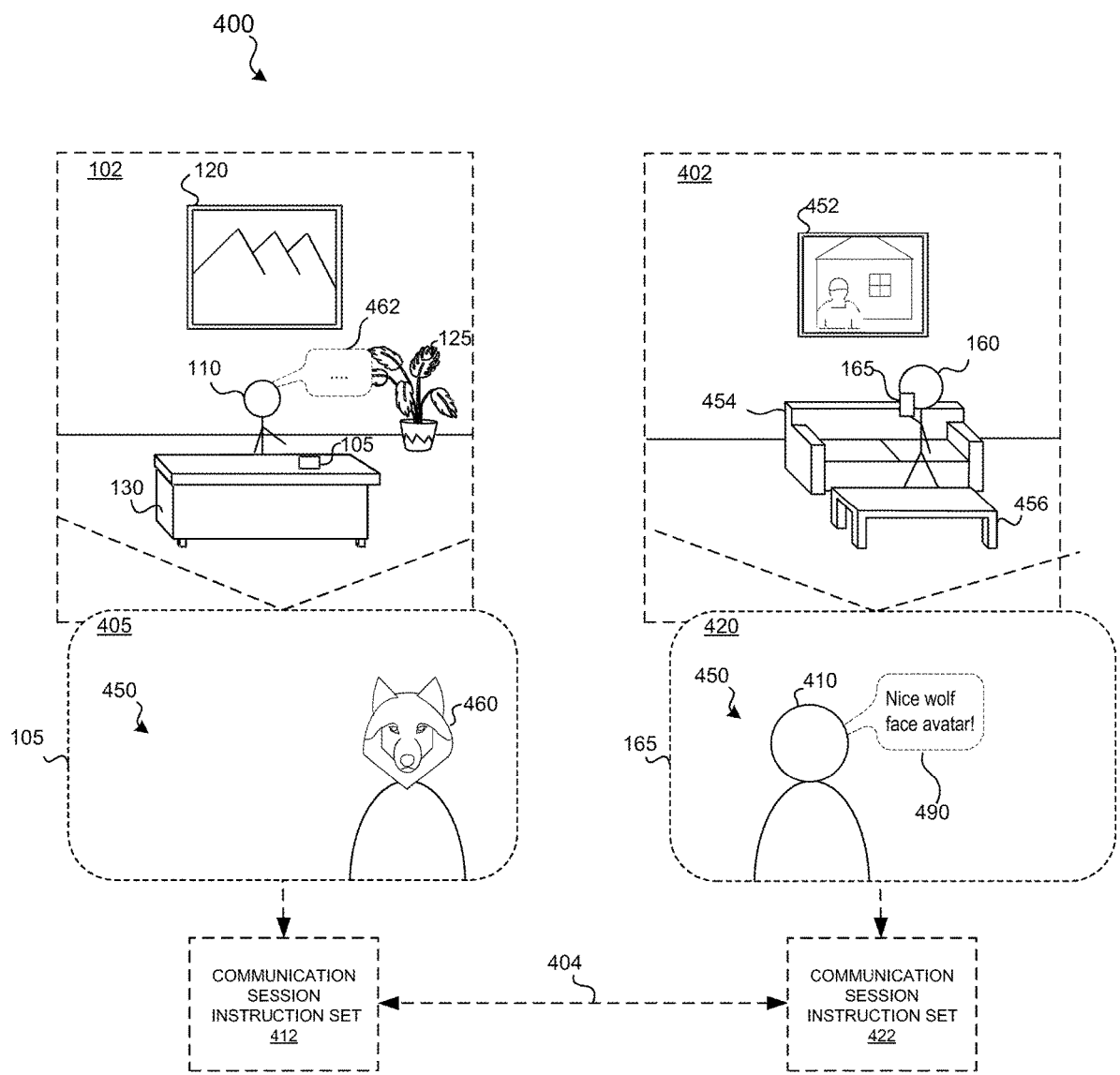
FIG. 4 illustrates exemplary electronic devices operating in different physical environments during a communication session with a view for a second device of a second user that includes a consent approval for a user representation of the second user for a view for a first user in accordance with some implementations.

FIG. 4 illustrates exemplary electronic devices operating in different physical environments during a communication session with a view for a second device of a second user that includes a consent approval for a user representation of the second user for a view for a first user in accordance with some implementations. In particular, FIG. 4 illustrates exemplary operating environment 400 of electronic devices 105, 165 operating in different physical environments 102, 402, respectively, during a communication session, e.g., while the electronic devices 105, 165 are sharing information with one another or an intermediary device such as a communication session server. In this example of FIG. 4, the physical environment 102 is a room that includes a wall hanging 120, a plant 125, and a desk 130. The electronic device 105 includes one or more cameras, microphones, depth sensors, or other sensors that can be used to capture information about and evaluate the physical environment 102 and the objects within it, as well as information about the user 110 of the electronic device 105. The information about the physical environment 102 and/or user 110 may be used to provide visual content (e.g., for user representations) and audio content (e.g., for text transcription) during the communication session. For example, a communication session may provide views to one or more participants (e.g., users 110, 160) of a 3D environment that is generated based on camera images and/or depth camera images of the physical environment 102, a representation of user 110 based on camera images and/or depth camera images of the user 110, and/or text transcription of audio spoken by a user (e.g., a transcription bubble). As illustrated in FIG. 4, user 110 is speaking to user 160 as shown by spoken words 462.

In this example, the physical environment 402 is a room that includes a wall hanging 452, a sofa 454, and a coffee table 456. The electronic device 165 includes one or more cameras, microphones, depth sensors, or other sensors that can be used to capture information about and evaluate the physical environment 402 and the objects within it, as well as information about the user 160 of the electronic device 165. The information about the physical environment 402 and/or user 160 may be used to provide visual and audio content during the communication session. For example, a communication session may provide views of a 3D environment that is generated based on camera images and/or depth camera images (from electronic device 105) of the physical environment 102 as well as a representation of user 160 based on camera images and/or depth camera images (from electronic device 165) of the user 160. For example, a 3D environment may be sent by the device 105 by a communication session instruction set 412 in communication with the device 165 by a communication session instruction set 422 (e.g., via network connection 404). As illustrated in FIG. 4, the audio spoken by user 110 (e.g., spoken words 462) is transcribed (e.g., via communication instruction set 422) at device 165 (or via remote server), and the view 420 provides user 160 with a text transcription of audio spoken by the speaker (user 110) via the transcription bubble 490 (e.g., "Nice wolf face avatar!"). FIG. 4 illustrates an example of a virtual environment (e.g., 3D environment 450) where a user preferred user representations (avatars) are provided to users for each user (e.g., a wolf avatar for user representation 460 of user 160), provided there is consent to view the user representations of each user during a particular communication session. For example, as illustrated in FIG. 4, the electronic device 165 within physical environment 402 provides a view 420 that enables user 160 to view a representation 410 (e.g., an avatar) of at least a portion of the user 110 (e.g., from mid-torso up) within the same 3D environment 450 with a transcription of the words spoken by the user 110 via the transcription bubble 490 (e.g., "Nice wolf face avatar!").

In the example of FIGS. 1-4, the electronic devices 105, 165, 175, 185 are illustrated as hand-held devices. The electronic devices 105, 165, 175, 185 may be a mobile phone, a tablet, a laptop, so forth. In some implementations, electronic devices 105, 165, 175, 185 may be worn by a user. For example, electronic devices 105, 165, 175, 185 may be a watch, a head-mounted device (HMD), head-worn device (glasses), headphones, an ear mounted device, and so forth. In some implementations, functions of the devices 105, 165, 175, 185 are accomplished via two or more devices, for example a mobile device and base station or a head mounted device and an ear mounted device. Various capabilities may be distributed amongst multiple device, including, but not limited to power capabilities, CPU capabilities, GPU capabilities, storage capabilities, memory capabilities, visual content display capabilities, audio content production capabilities, and the like. The multiple devices that may be used to accomplish the functions of electronic devices 105, 165, 175, 185 may communicate with one another via wired or wireless communications. In some implementations, each device communicates with a separate controller or server to manage and coordinate an experience for the user (e.g., a communication session server). Such a controller or server may be located in or may be remote relative to the physical environment 102.

Additionally, in the example of FIGS. 2 and 4, the 3D environments 250 and 450 are XR environments that are based on a common coordinate system that can be shared with other users (e.g., a virtual room for avatars for a multi-person communication session). In other words, the common coordinate system of the 3D environments 250 and 450 are different than the coordinate system of the physical environments 102. For example, a common reference point may be used to align the coordinate systems. In some implementations, the common reference point may be a virtual object within the 3D environment that each user can visualize within their respective views. For example, a common center piece table that the user representations (e.g., the user's avatars) are positioned around within the 3D environment. Alternatively, the common reference point is not visible within each view. For example, a common coordinate system of a 3D environment may use a common reference point for positioning each respective user representation (e.g., around a table/desk). Thus, if the common reference point is visible, then each view of the device would be able to visualize the "center" of the 3D environment for perspective when viewing other user representations. The visualization of the common reference point may become more relevant with a multi-user communication session such that each user's view can add perspective to the location of each other user during the communication session.

In some implementations, the representations of each user may be realistic or unrealistic and/or may represent a current and/or prior appearance of a user. For example, a photorealistic representation of the user 110 may be generated based on a combination of live images and prior images of the user. The prior images may be used to generate portions of the representation for which live image data is not available (e.g., portions of a user's face that are not in view of a camera or sensor of the electronic device 105 or that may be obscured, for example, by a headset or otherwise). In one example, the electronic devices 105, 165, 175, 185 are head mounted devices (HMD) and live image data of the user's face includes a downward facing camera that obtains images of the user's cheeks and mouth and inward facing camera images of the user's eyes, which may be combined with prior image data of the user's other portions of the users face, head, and torso that cannot be currently observed from the sensors of the device. Prior data regarding a user's appearance may be obtained at an earlier time during the communication session, during a prior use of the electronic device, during an enrollment process used to obtain sensor data of the user's appearance from multiple perspectives and/or conditions, or otherwise.

Some implementations provide a representation of at least a portion of a user within a 3D environment other than the user's physical environment during a communication session and, based on detecting a condition, provide a representation of another object of the user's physical environment to provide context. For example, during a communication session, representations of one or more other objects of the physical environment may be displayed in the view. For example, based on determining that the user 110 is interacting with a physical object in physical environment 102, a representation (e.g., realistic or proxy) may be displayed in a view to provide context for the interaction of the user 110. For example, if the first user 110 picks up an object, such as a family picture frame, to show to another user, a view may include a realistic view of the picture frame (e.g., live video). Thus, while displaying an XR environment, the view may present a virtual object that represents the user picking up a generic object, display a virtual object that is similar to a picture frame, display previous acquired image(s) of the actual picture frame from the obtained 3D scan, or the like.

According to some implementations, the electronic devices (e.g., electronic devices 105, 165, 175, 185, and the like) can generate and present an extended reality (XR) environment to one or more users during a communication session. In contrast to a physical environment that people can sense and/or interact with without aid of electronic devices, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 5:
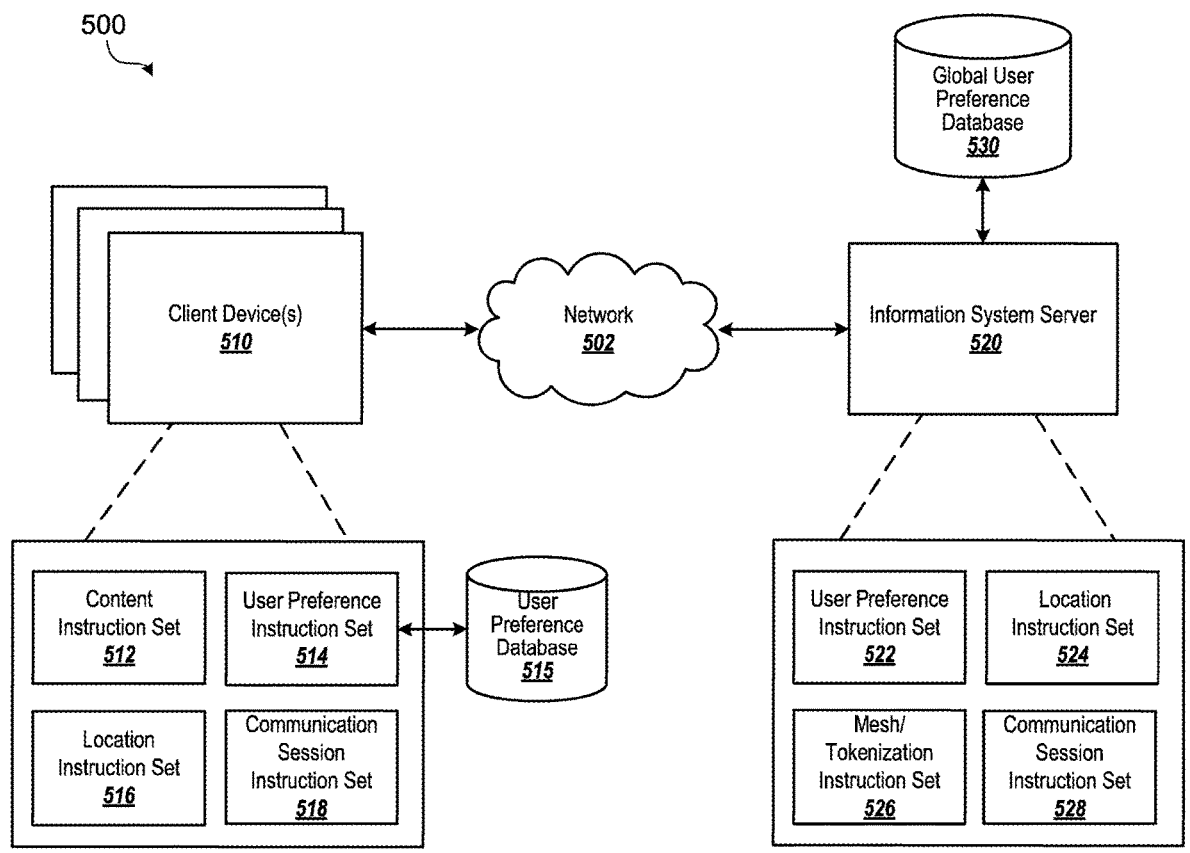
FIG. 5 illustrates an environment for implementing a process for determining how a second user prefers to be depicted/augmented in a privacy preserving way, according to embodiments of the invention.

FIG. 5 illustrates an example environment 500 for implementing a process for determining how a second user prefers to be depicted/augmented in a privacy preserving way, in accordance with some implementations. The example environment 500 include one or more client devices 510 (e.g., electronic devices 105, 165, 175, 185, etc.), and an information system server 520, that communicates over a data communication network 502, e.g., a local area network (LAN), a wide area network (WAN), the Internet, a mobile network, or a combination thereof.

The electronic device 510 (e.g., an electronic device used by a user, such as user device 105 used by user 110) may be a mobile phone, a tablet, a laptop, so forth. In some implementations, electronic device 510 may be worn by a user. For example, electronic device 510 may be a watch, a head-mounted device (HMD), head-worn device (glasses), headphones, an ear mounted device, and so forth. In some implementations, functions of the device 510 are accomplished via two or more devices, for example a mobile device and base station or a head mounted device and an ear mounted device. Various capabilities may be distributed amongst multiple devices, including, but not limited to power capabilities, CPU capabilities, GPU capabilities, storage capabilities, memory capabilities, visual content display capabilities, audio content production capabilities, and the like. The multiple devices that may be used to accomplish the functions of electronic devices 510, 105, 165, 175, 185 may communicate with one another via wired or wireless communications over network 502. In some implementations, each device communicates with a separate controller or server to manage and coordinate an experience for the user (e.g., an information system server 520 utilizing a communication session instruction set 528). Such a controller or server may be located in or may be remote relative to the physical environment of the device 510 (e.g., physical environment 102).

An example system flow of the example environment 500 includes the client device 510 acquiring light intensity image data (e.g., live camera feed such as RGB from light intensity cameras), depth image data (e.g., RGB-D from a depth camera), motion trajectory data from motion sensor(s) of a physical environment (e.g., the physical environment 102 of FIG. 1), acquires positioning information (e.g., a VIO module determines VIO data based on the light intensity image data), assesses the depth data and motion data to determine localization data of the device 510 (e.g., the location instruction set 516), and generates 3D representation data (e.g. representation 230 of desk 130) from the acquired sensor data (e.g., light intensity image data, depth data, and the like) and from the localization data to generate view (e.g., view 205), and generates user representations from the user preferred settings (e.g., user representation 260D). In some implementations, other sources of physical environment information can be acquired (e.g., camera positioning information such as position and orientation data from position sensors) as opposed to using a VIO system.

For positioning information, some implementations include a VIO to determine equivalent odometry information using sequential camera images (e.g., light intensity image data) and motion data (e.g., acquired from the IMU/motion sensor) to estimate the distance traveled. Alternatively, some implementations of the present disclosure may include a simultaneous localization and mapping (SLAM) system (e.g., position sensors). The SLAM system may include a multidimensional (e.g., 3D) laser scanning and range-measuring system that is GPS independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

In an example implementation, the client device 510 includes a location instruction set 516 that is configured with instructions executable by a processor to obtain sensor data (e.g., RGB data, depth data, etc.) and track a location of a moving device (e.g., device 510, device 105, etc.) in a 3D coordinate system using one or more techniques. For example, the location instruction set 516 analyzes RGB images from a light intensity camera with a sparse depth map from a depth camera (e.g., time-of-flight sensor), plane extraction data (e.g., plane estimation parameters), and other sources of physical environment information (e.g., camera positioning information such as VIO data, or a camera's SLAM system, or the like) to generate location data by tracking device location information for 3D reconstruction (e.g., a 3D model representing one or more objects of the physical environment of FIG. 1).

In an example implementation, the device 510 includes a content instruction set 512 that is configured with instructions executable by a processor to obtain the sensor data (e.g., RGB data, depth data, etc.) and location data from the location instruction set 516 and generate 3D representation data using one or more techniques. For example, the content instruction set 512 analyzes RGB images from a light intensity camera with a sparse depth map from a depth camera (e.g., time-of-flight sensor, passive or active stereo sensors such as a structured light depth camera, and the like), and other sources of physical environment information (e.g., camera positioning information such as VIO data, or a camera's SLAM system, or the like) to generate 3D representation data. For example, as illustrated in example view 205A in FIG. 2A, 3D representation data may include the representation 230 of the desk 130, representation 260A of the user 160 (e.g., an avatar) and a representation 220 of the wall hanging 120.

In an example implementation, the device 510 includes a user preference instruction set 514 that is configured with instructions executable by a processor to obtain user preference settings of a current user of device 510 or another user of another device. For example, in some implementations, the device 510 via user preference instruction set 514 obtains the user preference settings for another user from the information system server 520 via the user preference instruction set 522 and/or the global user preference database. Alternatively, in some implementations, the device 510 via user preference instruction set 514 obtains the user preference settings for another user from the user preference database 515 (e.g., for save user preferences if the other previously provided consent for the user to store the user preference settings). In some implementations, the device 510 via user preference instruction set 514 obtains the user preference settings for the current user from the user preference database 515 and sends those user preference settings to another client device 510 for the other user via the user preference instruction set 522 of the information system server 520.

In an example implementation, the device 510 includes a communication session instruction set 518 that is configured with instructions executable by a processor to facilitate a communication session between one or more other users via another client device 510. For example, a communication session may provide views of a 3D environment that is generated based on camera images and/or depth camera images (from electronic device 105) of a physical environment (e.g., physical environment 102) as well as representations of the other users (e.g., user representation 260D of user 160) based on camera images and/or depth camera images (from electronic device 165) of the user 160. For example, a 3D environment may be sent by the device 105 by a communication session instruction set 412 in communication with the device 165 by a communication session instruction set 422 (e.g., via network 404). As illustrated in FIG. 4, the audio spoken by user 110 (e.g., spoken words 462) is transcribed (e.g., via communication instruction set 422) at device 165 (or via remote server, such as via the communication instruction set 528 of the information system server 520), and the view 420 provides user 160 with a text transcription of audio spoken by the speaker (user 110) via the transcription bubble 490. FIG. 4 illustrates an example of a virtual environment (e.g., 3D environment 450) where audio transcriptions are provided to users for each user speaking, provided there is a consent to view and/or record the text transcriptions of each user during a particular communication session.

The information system server 520 (e.g., a server within the information system 104) is an external server that is configured to facilitate a user preference/privacy system between two or more client devices 510. In some implementations, the information system server 520 determines that a second user provides user consent to the receiving the user preference setting associated with the second user at a first device associated with a first user based on determining that a privacy setting associated with the second user (or from a device associated with the second user) allows providing the user preference setting of the second user to the first user. For example, the information system server 520 can access a user preference setting associated with user 160 at device 165 from the global user preference database 530 (e.g., via an anonymous system).

In an example implementation, the information system server 520 includes a user preference instruction set 522 that is configured with instructions executable by a processor to facilitate the exchange of user preference settings between two more client devices 510 (e.g., between device 105 and device 165 as discussed herein with reference to FIGS. 2A-2D). For example, the information system server 520 may access a user preference setting (e.g., a wolf avatar for user representation 260D of user 160) via the user preference instruction set 522 and determine whether or not a user consents to sharing of the user preference setting being shared.

In an example implementation, the information system server 520 includes a location instruction set 524 that is configured with instructions executable by a processor to facilitate the received positioning and/or location information received from a plurality of client devices 510 (e.g., user devices 105, 165, 175, 185, etc.). In an example implementation, the information system server 520 further includes a mesh/tokenization instruction set 526 that is configured with instructions executable by a processor to facilitate the received positioning and/or location information received from a plurality of anonymized devices from the location instruction set 524, facilitate tokenization processes for maintaining anonymization between devices, and/or facilitate a mesh network between plurality of devices. For example, a mesh network may be utilized based on the location/position data of multiple devices in a room (e.g., devices 105, 165, 175, 185, 510, etc.), while the identity of each device is kept anonymous (e.g., via anonymization, tokenization, etc.). In an exemplary implementation, the physical environment includes a third user (or more) associated with a third device that is to be depicted in the in the view of the 3D environment by the first device (e.g., device 175 for user 170, device 185 for user 180 within physical environment 102). In some implementations, determining position data indicative of the location of the second device relative to the first device is based on identifying a mesh network associated with location information for the first device, the second device, and the third device. For example, as illustrated in FIG. 3, a mesh network may be used to continuously update the locations of each device. For example, Device A (e.g., device 105) may send a message to the server (e.g., information system 104) saying "I see a device with anonymous token 1234 at location X," (e.g., device 105 identifies device 165 at location {EFGH}). Device B (e.g., device 165) might later say "I see a device with anonymous token 5678 at location X'." For example, because there is a rotating token system, anonymous token 5678 refers to the same device as token 1234 (e.g., device 185 identifies device 165 at location {EFGH}). Therefore, when Device C (e.g., device 175) sees a device (e.g., device 165) at location X", it can send the location X" to the server where the server will retrieve and return user settings associated with the device (e.g., device 165) that was previously determined to be around location X/X' at location {EFGH} (which should correspond to location X"), as anonymously determined by tokens sent by Device A and Device B.

FIG. 6 is a flowchart illustrating a method 600 for determining how a second user prefers to be depicted/augmented in a first user's view of a multi-user environment in a privacy preserving way, in accordance with some implementations. In some implementations, a device, such as electronic device 105, or electronic devices 165, 175, 185, and the like, or a combination of any/each, performs method 600. In some implementations, method 600 is performed on a mobile device, desktop, laptop, HMD, ear-mounted device or server device (e.g., information system server 520), or a combination thereof. The method 600 is performed by processing logic, including hardware, firmware, software, or a combination thereof. In some implementations, the method 600 is performed on a processor executing code stored in a non-transitory computer-readable medium (e.g., a memory).

At block 610, the method 600 determines that a physical environment includes a second device, where a second user is associated with the second device is to be depicted in a view of a 3D environment by the first device. For example, recognizing that there is another person to be depicted in an XR environment. In some implementations, the second user may be wearing, holding, or proximate the second device. For example, as illustrated in FIG. 2A, a first user (e.g., user 110) with a first device (e.g., device 105) and a second user (e.g., user 160) with a second device (e.g., device 165) are in the same physical environment (e.g., physical environment 102), and the first user can view a 3D environment (e.g., view 205D of 3D environment 250) with a depiction of the second user (e.g., representation 260A). In some implementations, the first device and/or the second device are HMDs, and the 3D environment is an XR environment.

In some implementations, the first user may be in the same physical environment (3D environment) as the second user. Alternatively, the 3D environment may be an XR environment, and the first user is participating (speaking) in the same XR environment as the second user, even though the first user and second user may be in different physical environments. For example, as illustrated in FIG. 4, user 110 is located at their office in physical environment 102, and user 160 is located at their living room in physical environment 402, but they are communicating via associated avatars during a virtual communication session in the 3D environment 450.

In some implementations, determining that the physical environment includes the second device includes determining that the second user is located in the physical environment and is depicted in the 3D environment.

At block 620, the method 600 determines position data indicative of a location of the second device relative to the first device. In some implementations, device 105 may include a sensor to determine relative distances and directions to the second device. For example, as illustrated in the location map 200B of FIG. 2B, the second device's location 245 is determined to be approximately ten feet to the north of the first device's location 240 at a particular time (e.g., based on the short-range sensor data, GPS coordinates, WiFi location, SLAM localization techniques, a combination thereof, or the like). In some implementations, device to device communication and could be meshed with multiple users as illustrated in FIG. 3.

In some implementations, the first device (e.g., device 105) includes a short-range sensor and determining position data indicative of the location of the second device relative to the first device is based on sensor data acquired from the short-range sensor. For example, the short-range sensor may be a ultra-wideband (UWB) sensor, or similar, with a range from approximately 3 to 10 GHz.

At block 630, the method 600 sends the position data indicative of the location of the second device relative to the first device to an information system. The user information system may be a user preference system or a server (e.g., information system 104, information system server 520, etc.). In some implementations, user consent is a particular type of user preference, e.g., where the first device requests to a particular depiction of the second user (e.g., as a wolf) and the second user is notified of this request and consents. In some implementations, the information system may use the position data to identify the first device, an account/user associated with it, and the user preferences associated therewith. Additionally, or alternatively, the information system may retrieve the preference data from the second device (e.g., sent anonymously via tokens).

In some implementations, the information system is a server external to the first device (e.g., information system server 520). Alternatively, in some implementations, the information system is located at the first device. For example, a device (e.g., device 105) may stores known user preferences of previously known users in a locally stored database (e.g., user preference database 515).

At block 640, the method 600 receives a user preference setting associated with the second user for depicting or augmenting the second user in the 3D environment from the information system. In some implementations, the first device (e.g., the first user's own display preferences) may determine to use or not use the second user's preferences in general/public use cases. In some implementations, in which the first user has agreed, the user preference associated with the second user may automatically be implemented.

In some implementations, the method 600 further includes determining whether the second user consents to sending the user preferences to the first user. In an exemplary embodiment, the method 600 receives a determination whether the second user provides user consent to the receiving the user preference setting associated with the second user at the first device from the information system. In some implementations, the user consent is a particular type of the user preference setting. For example, as illustrated in FIGS. 2A-2D, the first device requests to a particular depiction of the second user (e.g., as a wolf) and the second user is notified of this request and consents.

In some implementations, the information system determines that the second user provides user consent to the receiving the user preference setting associated with the second user at the first device based on receiving, at the first device via the information system, an affirmative response from the second user (or from a device associated with the second user) to a consent request. For example, as illustrated in FIG. 2C, the user 160 is provided a notification bubble 266 that the second user 160 needs to affirmatively select whether or not to allow consent (e.g., via an input device such as a mouse, via selecting an interactable element on the display of the device 165, via an audio cue such as saying "yes", or the like).

In some implementations, the information system determines that the second user provides user consent to the receiving the user preference setting associated with the second user at the first device based on determining that a privacy setting associated with the second user (or from a device associated with the second user) allows providing the user preference setting of the second user to the first user. For example, the information system server 520 can access a user preference setting associated with user 160 at device 165 from the global user preference database 530 (e.g., via an anonymous system).

In some implementations, the information system determines that the second user provides user consent to the receiving the user preference setting associated with the second user at the first device based on determining that the first user operating the first device was previously identified by the second user to have consent to the user preference setting. For example, device 105 may previously connected with device 165 and the user 160 provided consent and/or allowed user 110 to have consent in future communication sessions, and thus device 105 can store the user preference setting locally (e.g., client device 510 can obtain user preference settings for client device 510 or other devices, such as device 165, from the user preference database 515 via the user preference instruction set 514).

In some implementations, the presenting the view of the 3D environment that includes a depiction or augmentation of a representation of the second user based on the user preference setting associated with the second user. For example, as illustrated in FIG. 2D, the wolf face is presented as the user representation for user 160. In some implementations, presenting the view of the 3D environment that includes the depiction or the augmentation of the representation of the second user is based on user consent provided by the second user based on the user preference setting associated with the second user.

In some implementations, the method 600 further includes providing a notification to the second device based on receiving the user preference setting associated with the second user at the first device. For example, after user 160 consents to user 110 viewing the wolf avatar, the device 105 provides a notification to be displayed at device 165 that user 160 is viewing the updated avatar (e.g., the wolf).

In some implementations, the information system is configured to identify the first device based on the position data, identify an account associated with the first device, and identify the user preferences associated with the account. For example, the information system server 520 can access the user preferences associated with user 160 (e.g., the wolf avatar) from the global user preference database 530.

In some implementations, the information system acquires the user preference setting associated with the second user from the second device. In some implementations, the user preference setting associated with the second user from the second device is acquired anonymously based on tokenization protocols. For example, replacing sensitive identification information from each device with continuously randomized values that are synchronized anonymously with an encryption-based token vault (e.g., stored within the information system 104) that maintains the relationship with the original data outside the production environment. Thus, the determined location data that is provided to the information system to obtain user preference settings is associated with an anonymous token and not the identity of each device.

In some implementations, a mesh network may be utilized based on the location/position data of multiple devices in a room, while the identity of each device is kept anonymous (e.g., via anonymization, tokenization, etc.). In an exemplary implementation, the physical environment includes a third user (or more) associated with a third device that is to be depicted in the in the view of the 3D environment by the first device (e.g., device 175 for user 170, device 185 for user 180, etc.). In some implementations, determining position data indicative of the location of the second device relative to the first device is based on identifying a mesh network associated with location information for the first device, the second device, and the third device. For example, as illustrated in FIG. 3, a mesh network may be used to continuously update the locations of each device. For example, Device A (e.g., device 105) may send a message to the server (e.g., information system 104) saying "I see a device with anonymous token 1234 at location X," (e.g., device 105 identifies device 165 at location {EFGH}). Device B (e.g., device 165) might later say "I see a device with anonymous token 5678 at location X'." For example, because there is a rotating token system, anonymous token 5678 refers to the same device as token 1234 (e.g., device 185 identifies device 165 at location {EFGH}). Therefore, when Device C (e.g., device 175) sees a device (e.g., device

165) at location X", it can send the location X" to the server where the server will retrieve and return user settings associated with the device (e.g., device 165) that was previously determined to be around location X/X' at location {EFGH} (which should correspond to location X"), as anonymously determined by tokens sent by Device A and Device B.

In some implementations, the method 600 further includes determining whether to use the user preference setting associated with the second user based on a determined context of the 3D environment. For example, the user preference settings are determined based on a scene understanding of the 3D environment (e.g., a private conversation or general/public use). For example, positioning/characteristics of the user representations may be different based on aspects from a scene understanding of the 3D environment and the associated user preference settings (e.g., as stored in a global user preference database 530). For example, if at a concert, the user representation may be more noticeable, where if the users are watching a movie, a more subtle user representation may be used. For example, a scene analysis of an experience can determine a scene understanding of the visual and/or auditory attributes associated with content being presented to the user (e.g., what is being presented within the 3D environment) and/or attributes associated with the environment of the user (e.g., where is the user, what is the user doing, what objects are nearby). These attributes of both the presented content and environment of the user can improve the determination of the type of physical and/or XR environment the user's (e.g., the speaker and the listener) are in.

In some implementations, the method 600 provides a notification to a first user before allowing a preferred user representation. For example, the notification to the first suer prompts the first user that they need consent to view a preferred user representation of a second user. For example, as illustrated in FIG. 2C, a notification bubble 266 is provided to the user 110 that notifies the user 110 to allow consent. As discussed herein, consent may be provided based on privacy settings from the user, or by some form of approval/engagement with the second user (e.g., via user preference settings). For example, the user 110 may verbally request from user 160 if they consent with a particular avatar generation. If the verbal request is approved, the system may use that verbal consent to proceed and allow user 110 to view the user representation from that particular user. The verbal approval may be based on an event(s) (e.g., a particular event, such as a party) for a particular time period (e.g., a length of an event, or for day), and/or for a particular location. For example, if the speaker and listener leave that room or engage in other conversations with other people, then the consent may or may not be approved and thus may need to be acquired again before user representation can be obtained.

In some implementations, the method 600 provides positional data during a communication session between a first device and a second device. In some implementations, a view of the 3D environment including a representation of a user of the first device positioned based on the position data is presented to a user of the second device during the communication session. In some implementations, the representation of the first user may be based on user preference data obtained during the communication session (e.g., a user preferred avatar). Additionally, a privacy option may enable the first user to limit or otherwise select portions of the 3D environment to be shared if the communication session is displaying a representation of the physical environment of one of the users. In some implementations, the user may be provided with an indication of what is being shared to the second user, such as a preview of the user representation (e.g., an avatar) being shared with the second user before the second user is allowed to view the user representation.

In some implementations, the method 600 determines position data corresponding to a position of a first device relative to the XR environment, based on a location of the first device in the current environment and the spatial relationship between the XR environment with the current environment. In some implementations, the position data may include a location, an orientation, or a combination of the two (e.g., a pose).

In some implementations, the representation of at least the portion of the user of the first device and the representation of at least the portion of the user of the second device is generated based on sensor data obtained during the communication session. In some implementations, the communication session is in an XR environment, where the first user (e.g., a listener) is in a different physical environment than the second user (e.g., a speaker). For example, as illustrated in FIG. 4, the electronic device 105 within physical environment 102 provides a view 405 that enables user 110 to view a representation 460 (e.g., an avatar that includes a wolf's face) of at least a portion of the user 160 (e.g., from mid-torso up) within a 3D environment 450 (e.g., a communication session within an XR environment) based on the user preferences of the user 160. Additionally, for example, as illustrated in FIG. 4, the electronic device 165 within physical environment 402 provides a view 420 that enables user 160 to view a representation 410 (e.g., an avatar) of at least a portion of the user 110 (e.g., from mid-torso up) within the same 3D environment 450 (e.g., "Nice wolf face avatar!").

In some implementations, a view of the communication session is presented in an XR experience. In some implementations, each electronic device (e.g., electronic devices 105, 165, 175, 185, and the like) is an HMD. For example, if each user in the communication session (e.g., user 110 and user 160) is wearing an HMD, then providing a view of the representation of each user (e.g., an avatar) while engaging in a video/XR conversation would be more suitable than displaying a view of the user because the HMD may be cumbersome and may cover the user's face.

In some implementations, the privacy and/or audio transcription settings are automatically set based on a determined context of the physical environment. For example, in a quiet setting, such as a library, the font may be minimized or less distracting. Or, in a loud setting, such as at a music concert, the font of the audio transcription may be bigger and easier to notice that someone is speaking to the listener. The privacy and/or audio transcription settings can be adjusted at the speaker device and/or the listener device either automatically or adjusted by each user (e.g., the speaker of the listener).

In some implementations, the elements (e.g., the user representations as avatars or other objects) are shown as "blobs", faded, etc., during a privacy feature of the communication session. For example, visual attributes s associated with the representations may be altered (e.g., blurred/blob) when switching between a first presentation mode and a privacy presentation mode, and vice versa. The visual attributes may be visible for a viewpoint of a third device. For example, when two users interact in a direct messaging session (e.g., a private conversation), a third user on a third device in the multi-user communication session, may see the avatars of the two user in the direct messaging session as blurred out or faded, which may indicate to the third user that those two users are not available to interact with at that time during multi-user communication session. Then, when the direct messaging session has ended, then the visual attributes of the two user's avatars may be restored such that the third user can then interact with them again if desired.

Figure 7:
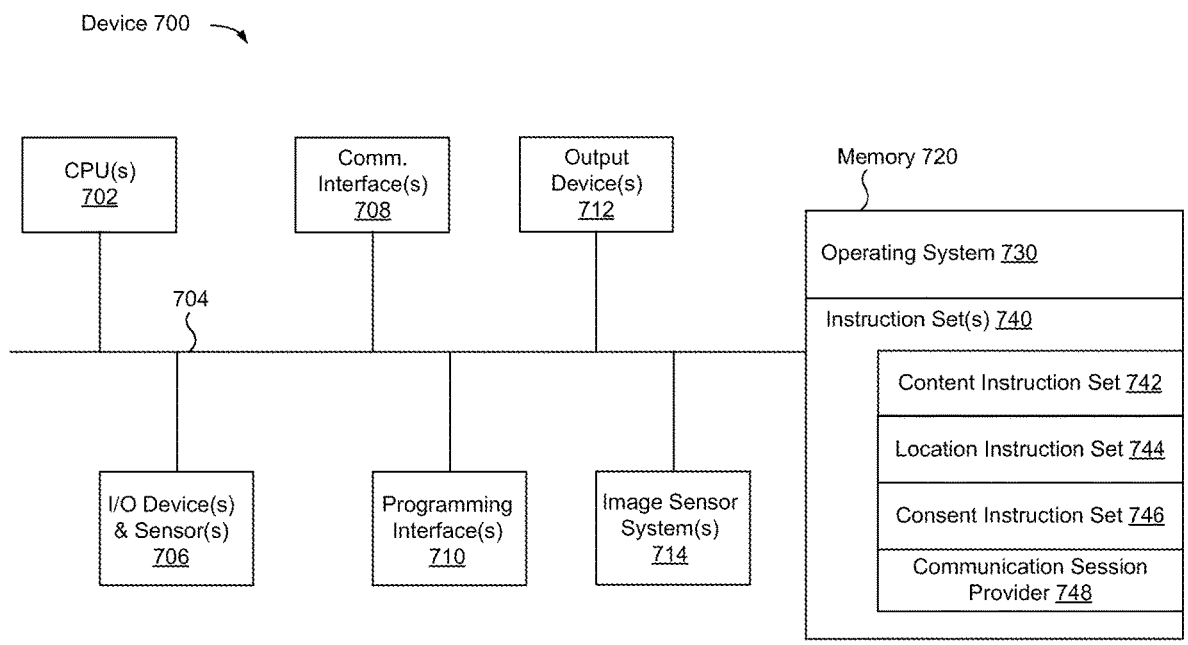
FIG. 7 is a block diagram of an electronic device in accordance with some implementations.

FIG. 7 is a block diagram of electronic device 700. Device 700 illustrates an exemplary device configuration for each electronic device described herein (e.g., electronic devices 105, 165, 175, 185, 510, and the like). While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 700 includes one or more processing units 702 (e.g., microprocessors, ASICs, FPGAs, GPUs, CPUs, processing cores, and/or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 12C, and/or the like type interface), one or more programming (e.g., I/O) interfaces 710, one or more output device(s) 712, one or more interior and/or exterior facing image sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 712 include one or more displays configured to present a view of a 3D environment to the user. In some implementations, the one or more output device(s) 712 correspond to holographic, digital light processing (DLP), liquid-crystal display (LCD), liquid-crystal on silicon (LCoS), organic light-emitting field-effect transistors (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 700 includes a single display. In another example, the device 700 includes a display for each eye of the user.

In some implementations, the one or more output device(s) 712 include one or more audio producing devices. In some implementations, the one or more output device(s) 712 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 712 may additionally or alternatively be configured to generate haptics.

In some implementations, the one or more image sensor systems 714 are configured to obtain image data that corresponds to at least a portion of a physical environment. For example, the one or more image sensor systems 714 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 714 further include illumination sources that emit light, such as a flash. In various implementations, the one or more image sensor systems 714 further include an on-camera image signal processor (ISP) configured to execute a plurality of processing operations on the image data.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 includes a non-transitory computer readable storage medium.

In some implementations, the memory 720 or the non-transitory computer readable storage medium of the memory 720 stores an optional operating system 730 and one or more instruction set(s) 740. The operating system 730 includes procedures for handling various basic system services and for performing hardware dependent tasks. In some implementations, the instruction set(s) 740 include executable software defined by binary information stored in the form of electrical charge. In some implementations, the instruction set(s) 740 are software that is executable by the one or more processing units 702 to carry out one or more of the techniques described herein.

The instruction set(s) 740 include a content provider instruction set 742 configured to, upon execution, provide a view of a 3D environment, for example, during a communication session, as described herein. The instruction set(s) 740 further includes a location instruction set 744 configured to, upon execution, determine and/or process location data of an electronic device as described herein. The instruction set(s) 740 further includes a consent instruction set 746 configured to, upon execution, process and/or analyze the user preference settings associated with a user as described herein. The instruction set(s) 740 further include a communication session provider instruction set 748 configured to, upon execution, determine to provide a communication session within a view of a 3D environment as described herein. The instruction set(s) 740 may be embodied as a single software executable or multiple software executables.

Although the instruction set(s) 740 are shown as residing on a single device, it should be understood that in other implementations, any combination of the elements may be located in separate computing devices. Moreover, FIG. 7 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws.

It is to be understood that the implementations shown and described herein are only illustrative of the principles of the present invention and that various modification may be implemented by those skilled in the art without departing from the scope and spirit of the invention.

What is claimed is:

1. A method comprising:
   at a first device operated by a first user, the first device having a processor:
   determining that a physical environment includes a second device, wherein a second user associated with the second device is to be depicted in a view of a three-dimensional (3D) environment by the first device;
   determining position data indicative of a location of the second device relative to the first device based on a privacy process that maintains anonymity from identification between the first device and the second device;
   sending, to an information system, the position data indicative of the location of the second device relative to the first device; and
   receiving, from the information system, a user preference setting associated with the second user for depicting or augmenting the second user in the 3D environment.

2. The method of claim 1, wherein determining that the physical environment includes the second device comprises determining that the second user is located in the physical environment and is depicted in the 3D environment.

3. The method of claim 1, wherein the first device comprises a short-range sensor and determining position data indicative of the location of the second device relative to the first device is based on sensor data acquired from the short-range sensor.

4. The method of claim 3, wherein the short-range sensor is an ultra-wideband (UWB) sensor.

5. The method of claim 1, further comprising:
   receiving, from the information system, a determination whether the second user provides user consent to the receiving the user preference setting associated with the second user at the first device.

6. The method of claim 5, wherein the information system determines that the second user provides user consent to the receiving the user preference setting associated with the second user at the first device based on receiving, at the first device via the information system, an affirmative response from the second user to a consent request.

7. The method of claim 5, wherein the information system determines that the second user provides user consent to the receiving the user preference setting associated with the second user at the first device based on determining that a privacy setting associated with the second user allows providing the user preference setting of the second user to the first user.

8. The method of claim 5, wherein the information system determines that the second user provides user consent to the receiving the user preference setting associated with the second user at the first device based on determining that the first user operating the first device was previously identified by the second user to have consent to the user preference setting.

9. The method of claim 1, wherein the information system is configured to identify the first device based on the position data, identify an account associated with the first device, and identify the user preferences associated with the account.

10. The method of claim 1, wherein the information system acquires the user preference setting associated with the second user from the second device.

11. The method of claim 10, wherein the user preference setting associated with the second user from the second device is acquired anonymously based on tokenization protocols.

12. The method of claim 1, further comprising:

determining whether to use the user preference setting associated with the second user based on a determined context of the 3D environment.

13. The method of claim 1, further comprising:

presenting the view of the 3D environment that includes a depiction or augmentation of a representation of the second user based on the user preference setting associated with the second user.

14. The method of claim 13, wherein presenting the view of the 3D environment that includes the depiction or the augmentation of the representation of the second user is based on user consent provided by the second user based on the user preference setting associated with the second user.

15. The method of claim 1, further comprising:

providing a notification to the second device based on receiving the user preference setting associated with the second user at the first device.

16. The method of claim 1, wherein the physical environment comprises a third user associated with a third device that is to be depicted in the in the view of the 3D environment by the first device.

17. The method of claim 16, wherein determining position data indicative of the location of the second device relative to the first device is based on identifying a mesh network associated with location information for the first device, the second device, and the third device.

18. The method of claim 1, wherein the information system is located at the first device.

19. The method of claim 1, wherein the information system is a server external to the first device.

20. A first device comprising:

a non-transitory computer-readable storage medium; and one or more processors coupled to the non-transitory computer-readable storage medium, wherein the non-transitory computer-readable storage medium comprises program instructions that, when executed on the one or more processors, cause the first device to perform operations comprising:

determining that a physical environment includes a second device, wherein a second user associated with the second device is to be depicted in a view of a three-dimensional (3D) environment by the first device;

determining position data indicative of a location of the second device relative to the first device based on a privacy process that maintains anonymity from identification between the first device and the second device;

sending, to an information system, the position data indicative of the location of the second device relative to the first device; and receiving, from the information system, a user preference setting associated with the second user for depicting or augmenting the second user in the 3D environment.

21. A non-transitory computer-readable storage medium storing program instructions executable via one or more processors to perform operations comprising:

determining that a physical environment includes a second device, wherein a second user associated with the second device is to be depicted in a view of a three-dimensional (3D) environment by a first device;

determining position data indicative of a location of the second device relative to the first device based on a privacy process that maintains anonymity from identification between the first device and the second device;

sending, to an information system, the position data indicative of the location of the second device relative to the first device; and receiving, from the information system, a user preference setting associated with the second user for depicting or augmenting the second user in the 3D environment.

* * * * *

UNITED STATES PATENT AND TRADEMARK OFFICE
CERTIFICATE OF CORRECTION

| | | |
|---|---|---|
| PATENT NO. | : 12,361,646 B1 | Page 1 of 1 |
| APPLICATION NO. | : 18/144976 | |
| DATED | : July 15, 2025 | |
| INVENTOR(S) | : Avi Bar-zeev, Ranjit Desai and Rahul Nair | |

It is certified that error appears in the above-identified patent and that said Letters Patent is hereby corrected as shown below:

In the Claims

Claim 16, Column 27, Line 28 reads:
"…depicted in the in the view of the 3D…"
Should read:
--…depicted in the view of the 3D…--

Signed and Sealed this
Twenty-sixth Day of August, 2025

Coke Morgan Stewart
*Acting Director of the United States Patent and Trademark Office*